United States Patent [19]

Bishop et al.

[11] 3,961,169

[45] June 1, 1976

[54] BIASED-BIT GENERATOR

[75] Inventors: Walton B. Bishop; John M. Hovey, both of Oxon Hill, Md.

[73] Assignee: The United States of America as represented by the Secretary of the Navy, Washington, D.C.

[22] Filed: Mar. 25, 1975

[21] Appl. No.: 561,967

[52] U.S. Cl.................................. 235/152; 331/78
[51] Int. Cl.².......................................... G06F 7/38
[58] Field of Search........................ 235/152, 150.1; 328/146–149; 331/78; 343/6.5 R, 6.5 LC

[56] References Cited
UNITED STATES PATENTS

| | | |
|---|---|---|
| 2,870,327 | 1/1959 | MacWilliams et al............. 328/149 |
| 3,423,683 | 1/1969 | Kelsey et al. .................... 328/147 X |
| 3,582,882 | 6/1971 | Titcomb et al. .................. 331/78 X |
| 3,790,768 | 2/1974 | Chevalier et al.................... 235/152 |
| 3,866,029 | 2/1975 | Chevalier............................ 235/152 |

OTHER PUBLICATIONS

Roger Barron, "Self–Organizing Control: the Next Generation of Controllers" *Control Engineering*, 2–1968, pp. 70–74 and 3–1968, pp. 69–74.

*Primary Examiner*—Jerry Smith
*Attorney, Agent, or Firm*—R. S. Sciascia; Philip Schneider; Norman Brown

[57] ABSTRACT

A biased sequence of binary bits is produced such that the probability that any randomly selected bit will be a "1" is equal to a preselected desired number.

5 Claims, 1 Drawing Figure

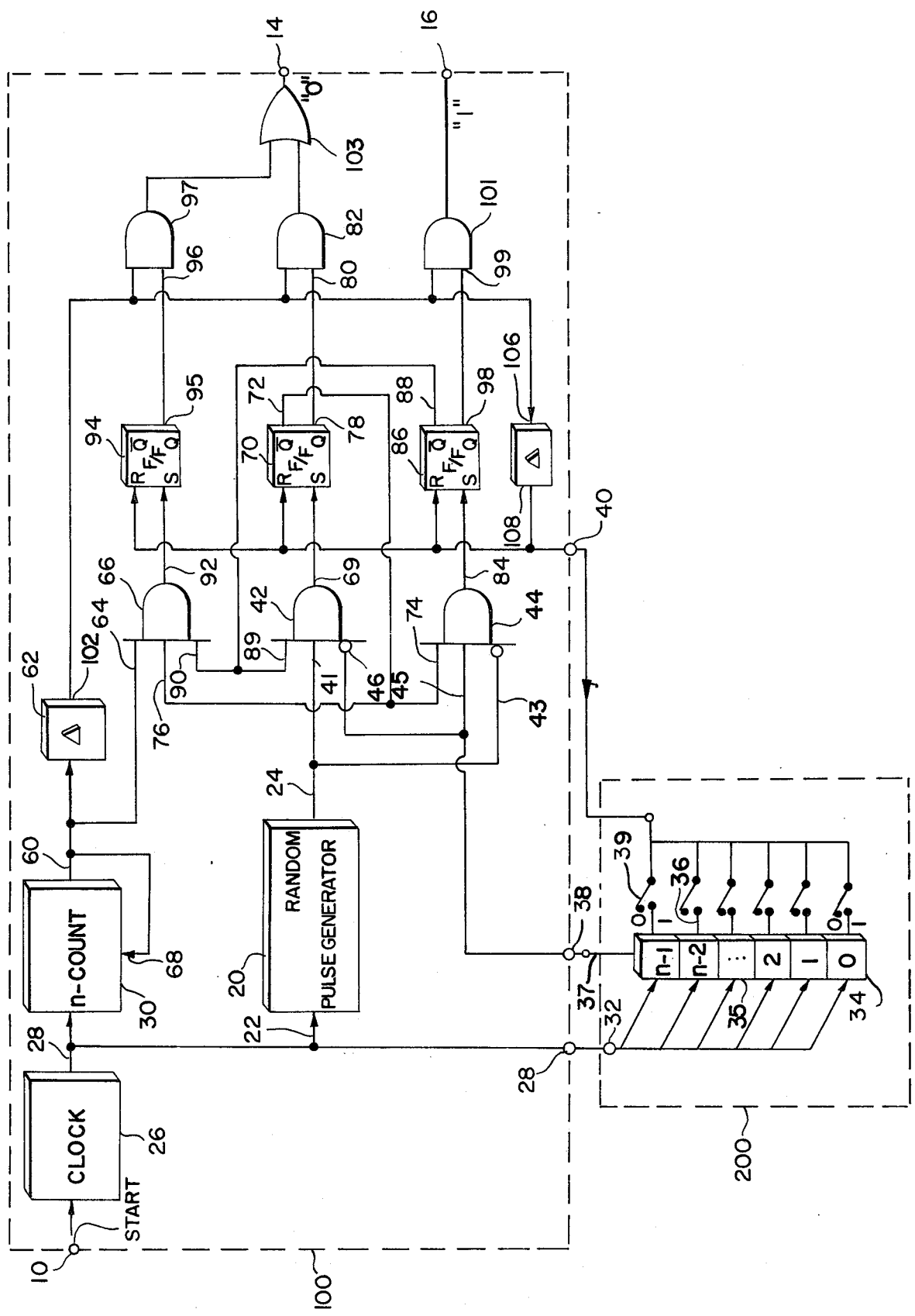

1

BIASED-BIT GENERATOR

BACKGROUND OF THE INVENTION

The present invention is related to binary data sequence-generators and more particularly to biased-bit binary data sequence-generators.

A biased-bit binary generator is a device which generates a continuous flow of binary data, wherein the data is characterized by the probability that any particular bit selected at random will be a binary 1 is equal to a specified desired value.

Biased-bit data generators are useful in a variety of applications, and are particularly useful in testing decision-making devices. In general, biased-bit binary generators permit Monte Carlo type statistical tests to be made of various types of decision devices. For example, a typical application of these devices is in testing the performance of Identification-Friend-or-Foe (IFF) decision devices (which locate and identify targets on the basis of replies to interrogations).

Previously, the general means of testing IFF decision devices has been by actual "flight tests" or by recording flight test data on video tape, and then using the tapes for laboratory testing of the IFF devices. These procedures are costly and time consuming. Computer analysis can sometimes be used to predict how well an IFF or other decision device should perform, but often these analyses are rather unconvincing.

SUMMARY OF THE INVENTION

The present invention generates a biased data stream of binary "1's" and "0's" in a manner such that the probability that any bit selected at random will be a 1 is approximately equal to a predetermined selected value. Random numbers Y are generated and compared with a preselected number B. When Y is equal to or larger than B, a 0 bit is generated; when Y is less than B 1 bit is generated.

It is therefore an object of the present invention to generate a biased binary data-stream.

Other objects, advantages and novel features of the invention will become apparent from the following detailed description of the invention when considered in conjunction with the accompanying drawings wherein:

DESCRIPTION OF THE FIGURE

The FIGURE is a schematic drawing of an embodiment of the present invention.

DETAILED DESCRIPTION

In the FIGURE, a binary sequence generator is depicted in phantom at 100, with a probability-setting means depicted in phantom at 200 connected thereto.

The binary sequence generator 100 includes a random (or pseudo-random) pulse-sequence generator 20 having an input-terminal 22 and output-terminal 24. A clock 26 has a clock-start input-terminal 10, and a clock-signal output-terminal 28 connected to random pulse-generator input-terminal 22. Clock-signal output-terminal 28 is also connected to an input-terminal of an *i*-counter 30, and to a clock input-terminal 32 of a shift-register 34.

Shift-register 34 is comprised of n stages 35 each having a tap-lead 36. The last register-stage (denoted as "*n*-1") is termed the most significant stage, and is connected to a register output-line 37. The register output-line is in turn connected to a number-sequence input-terminal 38. Each tap-lead 36 is connected to a first terminal of a corresponding one of a group of switches 39, collectively termed Bias Selector Switches. The second terminal of each switch 39 is connected to a reset-signal terminal 40. Shift-register 34 and associated switches 39 form the probability-setting means 200.

Random pulse-generator output-terminal 24 is connected to an input-terminal 41 of a first AND device 42, and to an inhibit input-terminal 43 of a second AND device 44. Register output line 37 is connected to a second input terminal 45 of second AND device 44, and to an inhibit input terminal 46 of first AND device 42. The n-counter 30 has an output-terminal 60 connected to the input-terminal of a first delay device 62, and to a first input-terminal 64 of a third AND device 66. The *n*-counter output-terminal 60 is also connected to a reset-terminal 68 of counter 30.

First AND device 42 has an output-terminal 69 connected to the "set" input-terminal of a first flip-flop device 70. Flip-flop device 70 and all other flip-flop devices utilized in this described embodiment of the present invention are of the type commonly referred to as "latching" or "set-reset" devices. That is, once set by a signal on a set input-terminal, its state switches and can then be reset only by a signal applied to the "reset" terminal. A complementary (i.e., $\bar{Q}$) output-terminal 72 of first flip-flop 70 is connected to both a third input-terminal 74 of second AND device 44, and to a second input-terminal 76 of third AND device 66. A non-complementary (i.e., Q) output-terminal 78 of first flip-flop 70 is connected to a first input-terminal 80 of a fourth AND device 82.

An output-terminal 84 of second AND device 44 is connected to the set input-terminal of a second flip-fop device 86. A complementary output-terminal 88 of second flip-flop 86 is connected to a third input-terminal 89 of first AND device 42, and to a third input-terminal 90 of third AND device 66.

Third AND device 66 has an output-terminal 92 connected to the set input-terminal of a third flip-flop device 94. A non-complementary output-terminal 95 of third flip-flop 94 is connected to a first input-terminal 96 of a fifth AND device 97. Similarly, the non-complementary output-terminal 98 of second flip-flop device 86 is connected to a first input-terminal 99 of a sixth AND device 101.

An output-terminal 102 of first delay device 62 is connected to a second input-terminal of each of fourth, fifth and sixth AND devices 82, 97, 101, and to an input-terminal 106 of a second delay device 108. An output-terminal of second delay device 108 is connected to reset-signal terminal 40, and to the reset-terminals of all flip-flop devices 70, 86, 94.

Sixth AND device 101 has an output-terminal 16. The output-terminals of fourth and fifth AND devices 82, 97 are connected to respective input-terminals of an OR device 103 having an output-terminal 14. Output terminals 14, 16 form 0 and 1 bit output-terminals respectively, for this described embodiment of the present invention.

Operation of the described embodiment of the invention is as follows:

Upon receiving a start signal at its input-terminal 10, clock 26 begins generating a sequence of clock pulses at its output terminal 28. The clock pulses are produced at a rate no higher than that at which pseudo-random pulse generator 20 is designed to operate.

Thus when pulse generator 20 receives a clock-pulse signal it either generates a generator output-pulse or it does not. Each generator output pulse represents a digital 1 bit, and each absence of a generator output pulse represents a digital 0 bit. Pseudo-random pulse sequence generator 20 has the important property of generating binary 1's and 0's (in a binary bit pulse stream at its output-terminal 24) in a manner such that the probability that any bit generated will be a 1 is essentially 0.5. Thus, on the average, pseudo-random pulse generator 20 generates, at its output-terminal 24, an output pulse (i.e., a 1) once for every two clock pulses applied at its input-terminal 22. Devices of this nature are conventional and well-known in the electronics art, and are readily available from many suppliers of electronic equipment. Each group of $n$-bit output pulses from pulse-generator 20 represent an $n$-bit binary number Y, with the first generated bit having the most significant value.

When applied at shift-register clock input-terminal 32, each clock-pulse from clock 26 will cause information stored in one shift-register stage 35 to be shifted to the next-most-significant adjacent stage (i.e., towards the most significant register stage $n$-1).

Each clock pulse applied to the $n$-counter 30 clock input-terminal causes $n$-counter 30 to count up one unit until it reaches a count of $n$ (where $n$ is the number of shift-register stages 35). Upon reaching a count of $n$, a counter output-pulse is generated at counter output terminal 60. This counter 30 output-pulse is applied to the input-terminal of first delay device 62, and to input-terminal 64 of third AND device 66, for purposes to be explained later. The counter output-pulse is also applied at counter reset-terminal 68, causing counter 30 to be reset to zero.

Bias selector switches 39 implement entry of an n-bit binary number into shift register 34. A closed switch results in a binary 1 being set in its corresponding shift register stage 35, and an open switch produces a binary 0. The binary number represented by the switch settings of bias selector switches 39 is termed B. (These switches must be set before operation of this embodiment of the invention is initiated). The bias selector switches 39 are set in accordance with the following rule:

If P equals the probability that any "bit" of the biased-bit data-sequence output signal, selected at random from the pulse sequence at the device output-terminals 14, 16 will be a 1, then bias selector switches 39 must be set to the binary number most nearly equal to the quantity $P(2^n)$. For example, if $P = 0.7$ and $n = 8$, then $P(2^n) = (0.7)(2^8) = 179.2$. Thus the bias selector switches 39 must be set to the closest binary number which is 10110011 (which represents the number 179).

Binary number B is entered (in parallel fashion) into the stages 35 of shift register 34 via tap leads 36. The most significant binary bit is located in the most significant register stage marked $n$-1. This stage carries a binary mathematical weight of $2^{n-1}$.

A clock pulse from clock 26 causes the content of the most significant stage of register stages 35 to be shifted into shift-register output-line 37. This clock-pulse also triggers random pulse-generator 20 causing a 50 percent chance of generating an output-pulse at generator output-terminal 24.

Table I lists four occurrence-conditions with their associated affect in the output of first, second, and third AND gates 42, 44, 66. A first condition, termed Condition I, occurs when a pulse is present on shift-register output-line 37 (i.e., output stage $n$-1 had a 1 shifted out), and at the same time an ouput-pulse from random pulse-generator 20 is present. In this condition, no pulse will be produced by either first or second AND gates 42, 44. This is because both inhibiting input-terminals, 43, 46 will receive a pulse and thereby inhibit their respective AND gate operation.

TABLE I

| CONDITION | SHIFT-REGISTER 34 OUTPUT | RANDOM PULSE GENERATOR 20 OUTPUT | AND GATE OUTPUTS | | |
|---|---|---|---|---|---|
| | | | 1$^{st}$ AND GATE 42 | 2$^{nd}$ AND GATE 44 | 3$^{rd}$ AND GATE 66 |
| I | 1 | 1 | 0 | 0 | 0 |
| II | 1 | 0 | 0 | 1 | 0 |
| III | 0 | 1 | 1 | 0 | 0 |
| IV | 0 | 0 | 0 | 0 | 0 |
| No occurrence of Condition II or III and n-counter 30 accumulates a count of n. | | | 0 | 0 | 1 |

1 = represents a pulse presence (binary "1")
0 = represents a pulse absense (binary "0")

A second condition, termed Condition II (see Table I), occurs when a pulse is present on shift-register output line 37 (i.e., output stage $n$-1 had a 1 shifted out), and no pulse is generated by random pulse-generator 20. In this case a pulse will be produced by second AND gate 44 at its output-terminal 84.

It should be noted that all flip-flops 70, 86, 94 are initially reset so that the complementary voltage $\bar{Q}$ is high. The pulse from AND gate 44 is then applied to the set terminal of second flip-flop 86, causing the flip-flop to reverse states. This action sets the non-complementary output voltage Q (at terminal 98) to "high", and the complementary output voltage $\bar{Q}$ (at terminal 88) to zero. Once second flip-flop 86 is set, any pulse signal from shift-register 34 or random-pulse generator 20 have no effect on the state of flip-flop device 86.

When the complementary voltage $\bar{Q}$ (at terminal 88) is set to zero, the voltage that would otherwise be applied at input terminals 89 and 90 of first and third AND gates 42, 66 is thus also set to zero, thereby inhibiting their operation.

The high non-complementary voltage Q (at output terminal 98) is applied to first input-terminal 99 of sixth AND gate 101. When $n$-counter 30 reaches a count of $n$, its output pulse, after a short delay in delay device 62, will be applied to a second input-terminal of sixth AND gate 101. Since both input-terminals to AND gate 101 are then high, an output pulse will be produced at its output-terminal 16.

A third condition, termed Condition III (see Table I), occurs when a pulse is generated by random pulse-generator 20, but no pulse is generated by shift register 34 (i.e., output stage $n-1$ had a 0 shifted out). When Condition III occurs, a pulse will be produced at first AND gate output-terminal 69. This pulse will then be applied to the set terminal of first flip-flop 70, causing its non-complementary voltage Q (at terminal 78) to go high, and the complementary voltage $\bar{Q}$ (at terminal 72) to go to zero. Once flip-flop 70 is set, any output signals from shift register 34 or random pulse-generator 20 have no effect on its state.

The zero complementary voltage $\bar{Q}$ (at terminal 72) removes the voltage otherwise applied at input terminals 74, 76 of second and third AND gates 44, 66, thus inhibiting them.

The high voltage at complementary output-terminal 78 is applied to a first input-terminal 80 of fourth AND gate 82. When $n$-counter 30 reaches a count of $n$, its output pulse, after a short delay by delay device 62, is applied to the other input terminal of fourth AND gate 82. Since both input terminals of fourth AND gate 82 are high, an output pulse is produced at its output-terminal and applied to one input of OR gate 103.

It should be noted that upon initiation by a clock signal, both random pulse-generator 20 and shift-register 34 always operate to produce their output signals before $n$-counter 30 produces its output-signal. Otherwise, an appropriate delay must be placed between the counter output terminal 60 and third AND gate input-terminal 64.

A fourth condition, Condition IV, occurs when neither shift register 34 nor random pulse-generator 20 produce a binary 1. In this condition first, second, third AND gates 42, 44, 66 remain inhibited.

Thus if the pulse sequence produced by random pulse-generator 20 is the same as the number B shifted out of register 34, then first and second AND gates 42, 44 will have remained inhibited. In this case, when $n$-counter 30 reaches a count of $n$, its output pulse will enable third AND gate 66 to produce an output pulse at its output-terminal 92. This output pulse sets third flip-flop 94 producing a high non-complementary voltage Q on its output terminal 95. The high complementary voltage Q on terminal 95 is applied to first input-terminal 96 of fifth AND gate 97. After a delay produced by first delay device 62, the pulse from $n$-counter 30 will also be applied at the other input-terminal of fifth AND gate 97, thereby causing it to generate an ouput-pulse which is in turn applied at an input-terminal of OR gate 103.

The pulse from n-counter 30, after being delayed by first delay-device 62, is applied to the first input-terminal 106 of second delay-device 108. After this second delay the pulse appears at reset-terminal 40. The delayed pulse from second delay device 108 also causes first, second, and third flip-flops 70, 86, 94 to be reset, since their reset terminals are connected to reset-terminal 40. The delayed pulse also causes the binary number B to be reinserted into stages 36 of shift-register 34 through settings of switches 39.

First, second, and third AND gates 42, 44, 66 in conjunction with corresponding first, second, and third flip-flop devices 70, 86, 94 form a relative magnitude determining network. Pulses from shift register 34 applied at the sequence input-terminal 38 represent the value of the binary number B. These pulses are fed to sequence input-terminal 38 in an order wherein the most significant bit is first, and subsequent bits decrease in significance.

Each of these shift-register output bits is sequentially compared with bits from the stream of binary bits constituting the binary number Y (from random-pulse generator 20). Whichever device (either shift register 34 or pulse generator 20) first produces a 1 when the other produces a 0 will produce the larger magnitude binary number, causing the associated flip-flop 70 or 86 to "lock-up" and thereby provide a relative-magnitude signal to either fourth or sixth AND gates 82, 101.

Thus, if the binary number B is larger than the binary number Y, a 1 is produced at the device output-terminal 16; but if B is smaller than or equal to Y, a "zero" will be produced at device output-terminal 14. From the above description it is clear that all random numbers Y equal to or greater than B produces a 0; but all random numbers Y less than B produce a 1.

Since the numbers Y are randomly distributed, on the average an equal number of them exist to represent each integer in the range 0 through $2^n$. Thus, B ($1/2^n$) of the Y values will be less than B (each of these values producing an output 1). In this manner the ratio of $B/2^n$ determines the proportion of 1's to 0's + 1's at the device output-terminals 16, 14. This proportion corresponds directly to the desired probability P.

The number of bits $n$, related to the size of the binary numbers B, Y, determines the resolution obtainable in the ratio $B/2^n$ and thereby determines the number of places of accuracy in the number P.

Thus, the described embodiment of the present invention generates a biased binary sequence in which the probability that any given output bit selected at random will be a 1 is equal to a predetermined desired number P. The biased binary sequence can constitute a signal having characteristics similar to those encountered in many different types of Friend-Accept situations. It thus permits Friend-Accept decision devices to be tested in a realistic fashion in a laboratory.

In general, diverse decision making situations may readily be simulated through resort to devices made or operated in accordance with the present invention as described herein.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A biased-bit generator comprising:
    means for generating a series of random $n$-bit binary numbers Y;
    means for generating a series of desired $n$-bit fixed-value binary numbers B, the value of B being indicative of a desired probability value and the binary Y and B groups being synchronized;
    means connected to the outputs of both aforesaid means for determining the relative magnitude between said numbers B and Y in each time-corresponding set, and for generating a relative magnitude indication signal;
    means connected to said relative magnitude determining and indicating means for generating a binary 1 when said indication signal indicates that a number Y is less that its associated set-number B, and for generating a binary 0 when said indication signal indicates that a number Y is greater than or equal to its associated set-number B, whereby said binary 1 s and 0 s are generated so that on the average the ratio of the number of 1 s to 0 s + 1 s is essentially equal to $(B/2^n)$.

2. The biased-bit generator of claim 1 wherein:

said number Y generating means is a random pulse-generator.

3. The biased-bit generator of claim 2 wherein:

said number B generating means comprises an $n$-bit shift register having $n$ stages, each said stage connected to a corresponding switch for setting a 0 or a 1 in its associated stage; and a digital clock connected to said shift register.

4. A biased-bit generator comprising:

a binary sequence generating means, said means comprising digital clock means having an output-terminal and an input-trigger-terminal, means for generating random pulses, said means having an output-terminal and an input-trigger-terminal connected to said clock means output-terminal, $n$-bit digital counter means having an output-terminal and an input-terminal connected to said clock means output terminal, means having a first input-terminal, a second input-terminal connected to said random pulse generator output-terminal for comparing the signals at said first and second input-terminals and for indicating which signal is larger, means connected to the output terminal of said $n$-bit counter means and to said comparison means for inhibiting said indicating signal until said $n$-bit counter accumulates a count of $n$;

probability-setting means comprising, a shift register having $n$ register stages each connected to a first terminal of a corresponding one of a set of switches, said shift register having an output terminal connected to said first input-terminal of said comparison means, and said shift register having a clock input-terminal connected to said clock means output-terminal; and means connected to said $n$-bit means, to a second terminal of said switches, and to said comparison means for resetting said devices connected thereto;

whereby binary bits from said random pulse-generating means are serially compared with the binary bits from said shift-register and whereby, after $n$-bits have been compared, a binary 0 is produced if a binary 1 bit from said pulse generating means is encountered before encountering a binary 1 bit from said shift register means, a binary 0 is produced if all bits compared have the same value and a binary 1 is is produced if a binary 1 bit from said shift-register means is encountered before a binary 1 bit from said pulse-generating means.

5. The method of generating a biased stream of digital numbers comprising the steps of:

generating a series of random $n$-bit binary numbers Y;

generating a series of desired $n$-bit fixed value binary numbers B, the value of B being indicative of a desired probability value and the binary Y and B groups being synchronized;

determining the relative magnitude between said numbers B and Y and in each time-corresponding set;

generating a binary 1 when a number Y is less than its associated set-number B, and generating a binary 0 when a number Y is greater than or equal to its associated set-number B.

* * * * *